United States Patent [19]

Ogura

[11] Patent Number: 5,068,910
[45] Date of Patent: Nov. 26, 1991

[54] IMAGE SIGNAL PROCESSOR FOR READING DARK AND LIGHT CHARACTERS FROM LIGHT AND DARK BACKGROUNDS RESPECTIVELY

[75] Inventor: Wataru Ogura, Nagano, Japan

[73] Assignee: Chinon Kabushiki Kaisha, Nagano, Japan

[21] Appl. No.: 338,045

[22] Filed: Apr. 14, 1989

[30] Foreign Application Priority Data

Jul. 14, 1988 [JP] Japan ................................ 63-175548

[51] Int. Cl.[5] ............................................ G06K 9/38
[52] U.S. Cl. ..................................... 382/50; 358/464; 358/466
[58] Field of Search ............... 358/166, 464, 465, 466; 382/18, 50, 54

[56] References Cited

U.S. PATENT DOCUMENTS

| | | | |
|---|---|---|---|
| 4,475,234 | 10/1984 | Nishijima et al. | 382/50 |
| 4,590,609 | 5/1986 | Chevalet et al. | 382/50 |
| 4,625,330 | 11/1986 | Higgins | 382/50 |
| 4,691,239 | 9/1987 | Nelson et al. | 358/466 |
| 4,748,677 | 5/1988 | Yokomizo | 358/464 |
| 4,963,036 | 10/1990 | Drisko et al. | 382/50 |

Primary Examiner—David K. Moore
Assistant Examiner—Jose L. Couso

[57] ABSTRACT

An image signal processor is capable of precisely reading a dark-colored character or the like drawn on a light-colored background, such as a white board, and to perform binary encoding, but also capable of precisely reading a light-colored character or the like drawn on a dark-colored background, such as a blackboard, and to perform binary encoding. The image signal processor includes an automatic gain control circuit for receiving an image signal generated by an image pickup element and for changing to either a first cutoff frequency for performing automatic gain control on only a low-frequency component of the signal or a second cutoff frequency for performing automatic gain control on both the low-frequency component and a high-frequency component of the image signal. A binary encoding circuit receives an output signal generated as a result of the automatic gain control operation in the automatic gain control circuit and compares the output signal with a threshold potential level; to generate a binary signal when the threshold potential level is lower than the potential level of a frequency component of the output signal. A separate threshold potential level and frequency component is used when the different background modes are selected. A gate circuit which is operated in conjuction with the change of the cutoff frequency is used to select the binary signal from the binary encoding circuit corresponding to the selected background mode.

11 Claims, 2 Drawing Sheets

IMAGE SIGNAL PROCESSOR FOR READING DARK AND LIGHT CHARACTERS FROM LIGHT AND DARK BACKGROUNDS RESPECTIVELY

BACKGROUND OF THE INVENTION

The present invention relates to an image signal processor for reading and printing a character or a pattern drawn on a white board, a blackboard, or the like.

There exists an image pickup and printing apparatus which is used in a manner such that a character, a pattern, or the like which is drawn on a screen, such as a white board, is projected through a lens while being monitored through a viewfinder which determines the angle of view for the projected object. An image of the projected object is created by an image pickup element, such as a charge-coupled device, which generates an image signal to operate a printer for printing the image on paper. That apparatus is mainly used to read a character, a pattern, or the like drawn in a dark color, such as black or red, on a light-color background, such as a white board. That apparatus cannot be directly used to read a character, a pattern, or the like drawn in a light color, such as white or yellow, on a dark-colored background, such as a blackboard.

To accomplish the reading operations in the existing apparatus, the background and the characters patterns are converted into mutually-reversed binary signals with respect to an image signal supplied from the image pickup element. The image signal is usually subjected to automatic gain control to stabilize an output signal. For that reason, when that apparatus is used to read the characters or the like drawn in a light color on a dark-colored background, the potential level of an output signal component for the dark-colored background is too high to perform binary encoding, as shown in FIG. 4.

When the existing apparatus is used to read the characters or the like drawn in a dark color on a light-colored background, the potential level of an image signal component for the characters or the like is lower than the potential level of an image signal component for the background. The image signal component for the background is, therefore, subjected to the automatic gain control so as to set the potential level of an output signal component near the saturation level of an amplifier, thereby making the amplitude of an output signal component for the character or the like large.

On the other hand, when the existing apparatus is used to read the characters or the like drawn in a light color on a dark-colored background, an image signal component for the background is subjected to the automatic gain control to set the potential level of an output signal component for the background near the saturation level of the amplifier. In that case, however, since the potential level of an image signal component for the character or the like is higher than the potential level of the image signal component for the background, the amplitude of an output signal component for the character or the like cannot be made large, as shown in FIG. 4.

For that reason, it is difficult to compare the potential level of the output signal component for the character or the like with the potential level of a comparison signal to perform binary encoding. Therefore, although the existing apparatus can be used to read a dark-colored character or the like drawn on a light-colored background, that apparatus cannot be directly used to read a light-color character or the like drawn on the dark-colored background, thereby establishing a problem with that apparatus.

SUMMARY OF THE INVENTION

Accordingly, it is an object of the present invention to provide an image signal processor which is capable of precisely reading a dark-colored character or the like drawn on a light-colored background, such as a white board, to perform binary encoding, as well as capable of precisely reading a light-colored character or the like drawn on a dark-colored background, such as a blackboard, to perform binary encoding.

The image signal processor comprises an automatic gain control circuit for receiving an image signal generated by an image pickup element and for changing to either a first cutoff frequency for performing automatic gain control on only a low-frequency component of the signal or a second cutoff frequency for performing automatic gain control on both the low-frequency component and a high-frequency component of the image signal; a first binary encoding circuit for receiving an output signal generated as a result of the automatic gain control in the automatic gain control circuit and for comparing the output signal with a first threshold potential level; the first binary encoding circuit generating a binary signal when the first threshold potential level is lower than the potential level of the low-frequency component of the output signal generated as a result of the automatic gain control based on the first cutoff frequency; a second binary encoding circuit for receiving the output signal generated as a result of the automatic gain control in the automatic gain control circuit and for comparing the output signal with a second threshold potential level; the second binary encoding circuit generating a binary signal when the second threshold potential level is higher than the potential level of the low-frequency component of the output signal generated as a result of the automatic gain control based on the second cutoff frequency; and a gate circuit which is operated in conjunction with the change of the cutoff frequency in the automatic gain control circuit so as to selectively send out either the binary signal from the first binary encoding circuit at the time of setting of the first cutoff frequency in the automatic gain control circuit or the binary signal from the second binary encoding circuit at the time of setting of the second cutoff frequency in the automatic gain control circuit.

The background component of the image signal has a low frequency, while the character component of the image signal has a high frequency. The light-colored component of the image signal has a high potential level, while the dark-colored component of the image signal has a low potential level. For these reasons, the automatic gain control circuit is set at the first cutoff frequency which is a low frequency, when the image signal processor is placed in a light-colored background mode in which a dark-colored character or the like is drawn on a light-colored background is imaged. In this case, the automatic gain control is performed on the light-colored background component (which is a low-frequency component) of the image signal but not performed on the dark-colored character component (which is a high-frequency component) of the image signal. As a result, the potential level of the light-colored background component is made to be close to the saturation level of an amplifier so that the amplitude of the dark-colored character component generated which is normally a low potential can be made sufficiently large, as shown in FIG. 2.

When the image signal processor is placed in a dark-colored background mode in which the dark-colored background is imaged, the automatic gain control circuit is set at the second cutoff frequency which is a high frequency, so that the automatic gain control is performed on both the dark-colored background component (which is a low-frequency component) and light-colored character component (which is a high-frequency component) of the image signal. In this case, the potential level of the dark-colored background component is suppressed to a low level such that the amplitude of the light-colored character component generated which is a normally high potential level can be made sufficiently large, as shown in FIG. 3.

As a result, the potential level of the character component of the image signal in each of the modes is made sufficiently higher than the first or second threshold potential level set in the first or second binary encoding circuit corresponding to the mode selected. For that reason, the output signal from the automatic gain control circuit is ensured to be converted into a properly representative binary signal in each of the modes. The cutoff frequency of the automatic gain control circuit is thus changed depending upon the characteristic of the imaged object, thereby making the amplitude of the required signal component appropriate for enabling a proper encoding.

BRIEF DESCRIPTION OF THE DRAWINGS OF THE PRESENT INVENTION

Other objectives and advantages of the present invention will become more apparent from the detailed description of the preferred embodiments with reference to the accompanying drawing wherein.

DETAILED DESCRIPTION OF THE PRESENT INVENTION

An embodiment of the present invention is described below in detail with reference to the drawings attached hereto.

Figure 1:
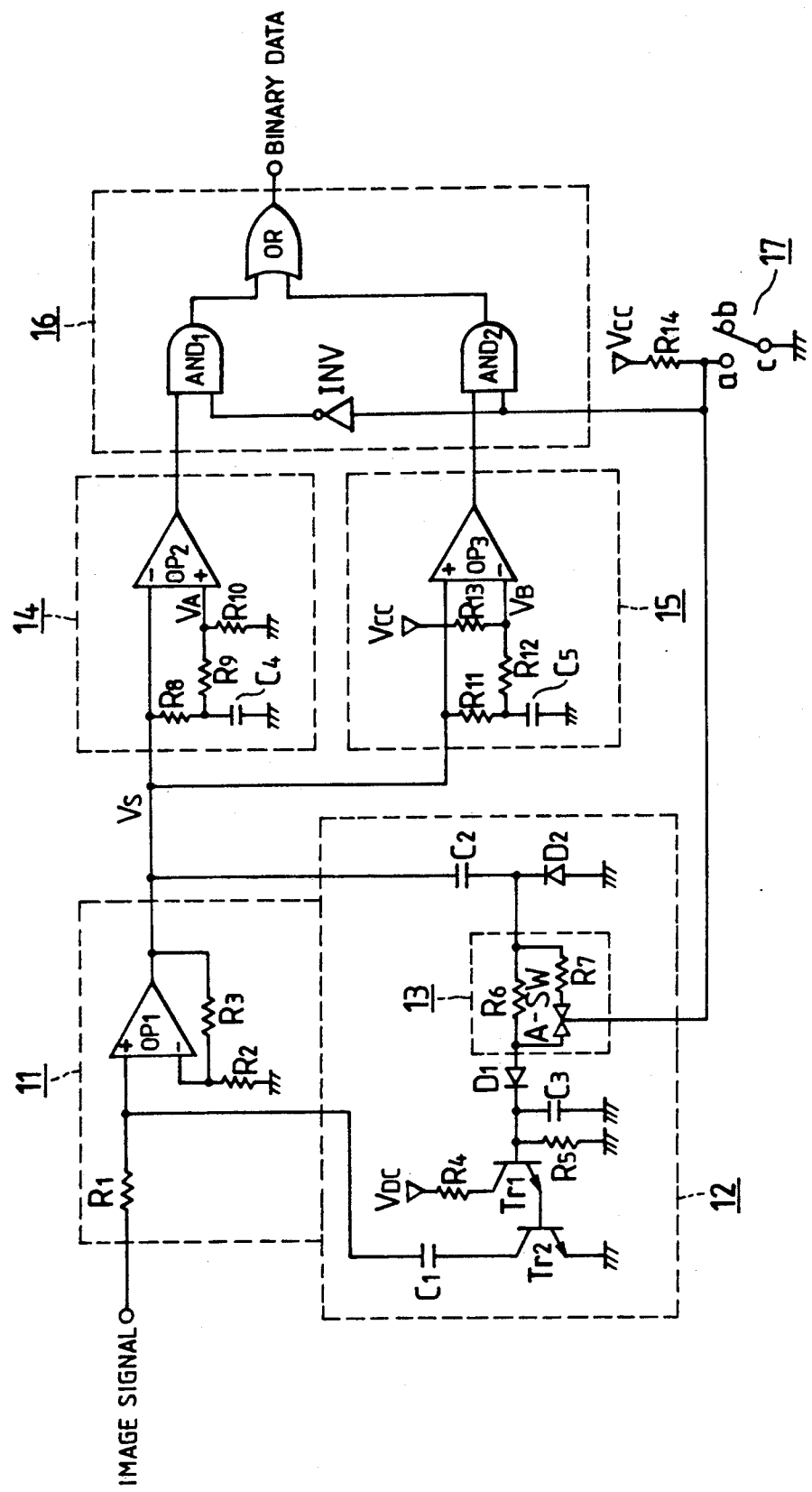
FIG. 1 shows a wiring diagram of an image signal processor according to an embodiment of the present invention.

FIG. 1 shows a wiring diagram of an image signal processor according to an embodiment of the present invention. The processor comprises a signal input circuit 11, an automatic gain control circuit 12, a cutoff frequency changer 13, a first binary encoding circuit 14, a second binary encoding circuit 15, a gate circuit 16, and a selection switch 17.

The signal input circuit 11 has an operational amplifier $OP_1$ which is a non-inversion amplifier. An image signal generated by an image pickup element, such as a charge-coupled device, which is not shown in the drawings, is supplied to the plus input terminal of the amplifier $OP_1$ through a resistor $R_1$. The minus input terminal of the amplifier $OP_1$ is grounded through a resistor $R_2$ and connected to the output terminal of the amplifier though a resistor $R_3$.

The automatic gain control circuit 12 has two transistors $Tr_1$ and $Tr_2$ for performing automatic gain control on the image signal in terms of a cutoff frequency, described below, to generate an output signal of a prescribed potential level. The collector of the transistor $Tr_1$ is connected to a power supply $V_{DC}$ through a resistor $R_4$. The emitter of the transistor $Tr_1$ is connected to the base of the other transistor $Tr_2$ whose collector is connected to the plus input terminal of the operational amplifier $OP_1$ through a capacitor $C_1$ and whose emitter is grounded. The base of the transistor $Tr_1$ is connected to the output terminal of the amplifier $OP_1$ through a capacitor $C_2$. The base of the transistor $Tr_1$ is also connected to the cutoff frequency changer 13 and a diode $D_1$ whose cathode is grounded through a capacitor $C_3$ and a resistor $R_5$. The terminal of the capacitor $C_2$, which is located opposite the output terminal of the amplifier $OP_1$, is grounded through a diode $D_2$.

The cutoff frequency changer 13 includes a resistor $R_6$ and a resistor $R_7$ connected in parallel through an analog switch A-SW. The resistance of the resistor $R_7$ is about ten times as much as the resistor $R_6$. When the analog switch A-SW is turned off, a first cutoff frequency, which is a low frequency, is set. When the switch A-SW is turned on, a second cutoff frequency, which is a high frequency, is set.

The first binary encoding circuit 14 receives the output signal $V_S$ generated as a result of the automatic gain control on the image signal by the automatic gain control circuit 12, to perform the binary encoding of the output signal. The first binary encoding circuit 14 has an operational amplifier $OP_2$ which acts as a comparator. The output signal $V_S$ is applied to the minus input terminal of the amplifier $OP_2$, which is also grounded through a resistor $R_8$ and a capacitor $C_R$. The plus input terminal of the amplifier $OP_2$ is grounded through a resistor $R_{10}$ and through a resistor $R_9$ and capacitor $C_4$. As a result, a first threshold potential level $V_A$, which is set by integrating the output signal $V_S$ and making this integrated value slightly lower, is applied to the plus input terminal of the amplifier.

Figure 2:
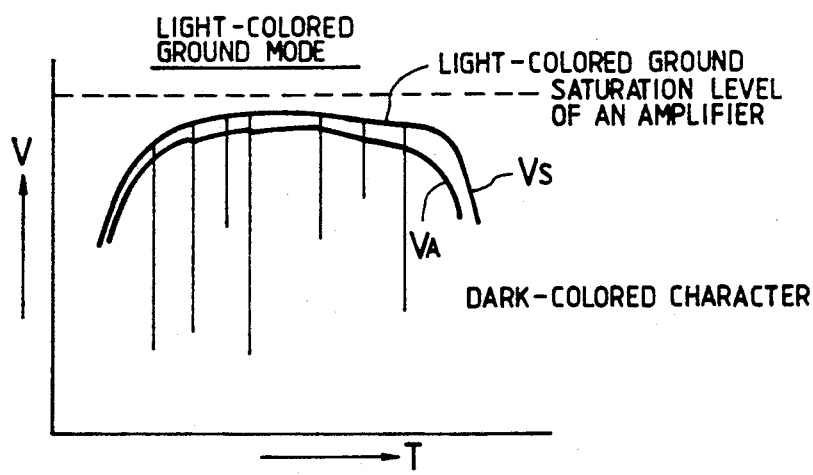
FIG. 2 shows graphs of signal components generated by the processor of the present invention in a light-colored background mode.

As shown in FIG. 2, the first threshold potential level $V_A$ is set to be slightly lower than the potential level of the light-colored background component (which is a low-frequency component) of the output signal $V_S$ generated in a light-colored background mode in which the first cutoff frequency, which is the low frequency, is set.

The second binary encoding circuit 15 also receives the output signal $V_S$ to perform binary encoding on the output signal $V_S$. The second binary encoding circuit 15 has an operational amplifier $OP_3$ which acts as a comparator. The output signal $V_S$ is applied to the plus input terminal of the amplifier $OP_3$ which is also grounded through a resistor $R_{11}$ and a capacitor $C_5$. The minus input terminal of the amplifier $OP_3$ is grounded though a resistor $R_{12}$ and a capacitor $C_5$. The minus input terminal of the amplifier $OP_3$ is also connected to a power supply $V_{CC}$ through a resistor $R_{13}$.

Figure 3:
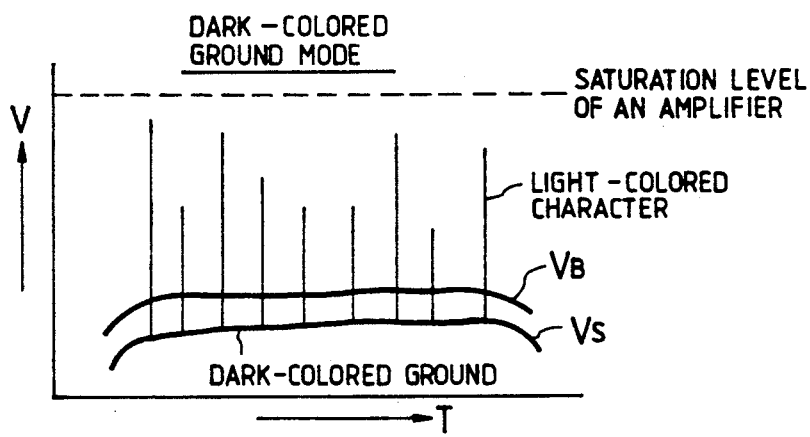
FIG. 3 shows graphs of signal components generated by the processor of the present invention in a dark-colored background mode.

As a result, a second threshold potential level $V_B$, which is set by integrating the output signal $V_S$ and making this integrated value slightly higher, is applied to the minus input terminal of the amplifier $OP_3$. As shown in FIG. 3, the second threshold potential level $V_B$ is set to be slightly higher than the potential level of the dark-colored background component (which is a low-frequency component) of the output signal $V_S$ generated in a dark-colored background mode in which the second cutoff frequency, which is the high frequency, is set.

The gate circuit 16 has two AND gates, $AND_1$ and $AND_2$, for selecting either the output from the first or the second binary encoding circuits, 14 and 15. The output from the first binary encoding circuit 14 is applied to one input terminal of the AND gate $AND_1$. A changeover signal from the selection switch 17 is applied to the other input terminal of the AND gate $AND_1$ through an inverter INV. The output from the second binary encoding circuit 15 is applied to one input terminal of the other AND gate $AND_2$. The changeover signal from the selection switch 17 is applied to the other input terminal of the AND gate $AND_2$ directly. Only one of the outputs from the AND gates, $AND_1$ and $AND_2$, is sent as final binary data through an OR gate OR.

The selection switch 17 has changeover terminals, a and b, and a common terminal c. The changeover terminal a is connected to the power supply $V_{CC}$ through a resistor $R_{14}$. The common terminal c is grounded. The changeover signal is supplied to the cutoff frequency changeover analog switch A-SW of the automatic gain control circuit 12 and to the gate circuit 16, through the changeover terminal a, to change the cutoff frequency and to enable one of the AND gates, $AND_1$ and $AND_2$.

The operation of the image signal processor will be described in detail below. When a dark-colored character or the like drawn on a light-colored background, such as a whiteboard, is to be imaged, the selection switch 17 is first operated to connect the changeover terminal a to the common terminal c. This operation puts the processor in the light-colored background mode. As a result of this operation, the changeover signal is set at a low potential level, thereby turning off the analog switch A-SW which sets the first cutoff frequency, a low frequency. Also, the AND gate $AND_1$ for the first binary encoding circuit 14 is enabled through the operations of the inverter INV.

When the image signal generated by imaging the dark-colored character or the like drawn on the light-colored background is then supplied to the processor, the automatic gain control circuit 12 performs the automatic gain control on the image signal in terms of the first cutoff frequency so that the automatic gain control is performed on the light-colored background component (which is a low-frequency component) of the signal but not performed on the dark-colored character component (which is a high-frequency component) of the signal. For that reason, the light-colored background component (which is a low-frequency component) of the output signal $V_S$ has a high potential level, which is close to the saturation level of the amplifier, and the dark-colored character component (which is a high-frequency component) of the output signal has a potential level lower than the light-colored background component and has a large amplitude, as shown in FIG. 2. The comparator $OP_2$ of the first binary encoding circuit 14 compares the output signal $V_S$ with the first threshold potential level $V_A$ which is slightly lower than the potential level of the light-colored background component of the output signal, so that the circuit generates a binary signal whose light-colored background component has a low potential level and whose dark-colored character component has a high potential level.

The binary signal is sent out through the AND gate $AND_1$ and the OR gate OR of the gate circuit 16. Since the dark-colored component (which is the high-frequency component) of the output signal $V_S$ has the large amplitude and the low potential level which is sufficiently lower than the first threshold potential level $V_A$, binary encoding is enabled.

When a light-colored character or the like drawn on a dark-colored background, such as a blackboard, is to be imaged, the selection switch 17 is first operated to connect the changeover terminal b to the common terminal c. This operation puts the processor in the dark-colored background mode. As a result of this operation, the changeover signal is set at a high potential level, and the analog switch A-SW is turned on, thereby setting the second cutoff frequency, a high frequency. Also, the AND gate $AND_2$ of the gate circuit 16 is made capable of being opened. When the image signal generated by imaging the light-colored character or the like drawn on the dark-colored background is applied to the processor, the automatic gain control circuit 12 performs automatic gain control on the signal according to the second cutoff frequency, which is the high frequency, so that the automatic gain control is performed on both the dark-colored background component (which is a low-frequency component) and light-colored character component (which is a high-frequency component) of the signal. In other words, the automatic gain control is performed without neglecting the light-colored character component which contains information concerning the light-colored character or the like.

As a result, the dark-colored background component (which is a low-frequency component) of the output signal $V_S$ is suppressed to a low potential level, which is sufficiently lower than the saturation level of the amplifier, as shown in FIG. 3. For that reason, the light-colored character component (which is a high-frequency component and has a higher potential level than the dark-colored background component) of the output signal $V_S$ has a sufficiently large amplitude. The comparator $OP_3$ of the second binary encoding circuit 15 compares the output signal $V_S$ with the second threshold potential level which is slightly higher than the potential level of the dark-colored background component, so that a binary signal whose dark-colored background component has a low potential level and whose light-colored character component has a high potential level is generated by the circuit. The binary signal is sent out through the AND gate $AND_2$ and the OR gate OR. Since the light-colored component has the sufficiently large amplitude and a sufficiently higher potential level than the second threshold potential level $V_B$, binary encoding is enabled.

While only certain embodiments of the present invention have been described, it will be apparent to those skilled in the art that various changes and modifications may be made therein without departing from the spirit and scope of the present invention as set forth in the claims below.

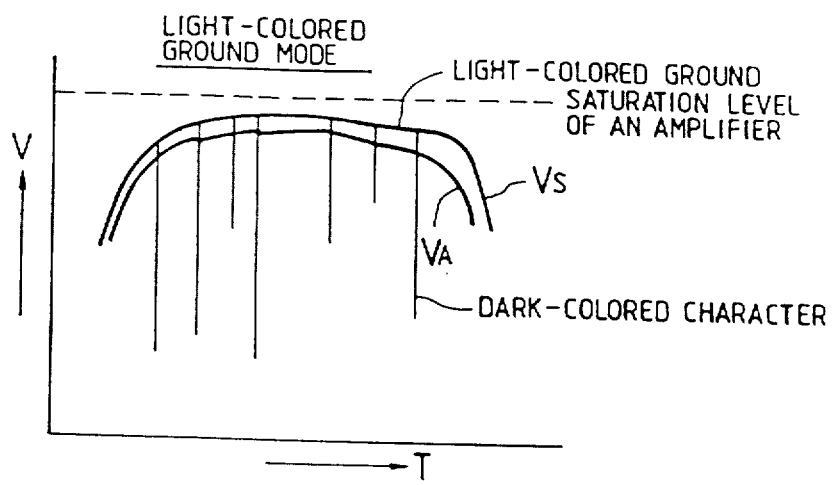

What is claimed is:

1. An image signal processor comprising:
   image pickup means for generating an image signal corresponding to an image to be processed;
   automatic gain control means, operatively connected to said image pickup means, for performing an automatic gain control operation in response to a frequency component of said image signal according to whether said image comprises a light background or a dark background;

selection means, operatively connected to said automatic gain control means, for manually setting a cutoff frequency to be used in said automatic gain control operation of said automatic gain control means; and binary encoding means, operatively connected to said automatic gain control means and said selection means, for producing binary data of said image signal according to said cutoff frequency set by said selection means.

2. The image signal processor as claimed in claim 1, wherein said selection means comprises an analog switch for selecting either a light background mode or a dark background mode.

3. An image signal processor comprising:
image pickup means for generating an image signal corresponding to an image to be processed;

automatic gain control means, operatively connected to said image pickup means, for performing an automatic gain control operation in response to a frequency component of said image signal according to whether said image comprises a light background or a dark background;

selection means, operatively connected to said automatic gain control means, for manually setting a cutoff frequency to be used in said automatic gain control operation of said automatic gain control means;

binary encoding means, operatively connected to said automatic gain control means and said selection means, for producing binary encoding signals of said image signal; and gating means, operatively connected to said binary encoding means and said selection means, for selecting said binary encoding signals corresponding to said cutoff frequency;

said selection means setting one of at least two cutoff frequencies to be used in said automatic gain control operation;

said binary encoding means producing a distinct set of binary data for each cutoff frequency selected.

4. The image signal processor as claimed in claim 3, wherein said selection means comprises an analog switch for selecting either a light background mode or a dark background mode, each background mode having a cutoff frequency associated therewith.

5. The image signal processor as claimed in claim 3, wherein said binary encoding means has a distinct output port for each said set of binary data corresponding to a single cutoff frequency.

6. The image signal as claimed in claim 3, wherein said gating means comprises:
first AND gate means, responsive to said selection means and operatively connected to an output of said binary encoding means, for selecting said binary encoding signals corresponding to a first cutoff frequency;

second AND gate means, responsive to said selection means and operatively connected to an output of said binary encoding means, for selecting said binary encoding signals corresponding to a second cutoff frequency; and OR gate means, operatively connected to said first and second AND gate means, for outputting the selected binary encoding signals from said gating means.

7. An image signal processor, comprising:

image pickup means for generating an image signal corresponding to an image to be processed;

automatic gain control means, operatively connected to said image pickup means, for performing an automatic gain control operation in response to a frequency component of said image signal according to whether said image comprises a light background or a dark background;

cutoff frequency generating means, operatively connected to said automatic gain control means, for generating a cutoff frequency to be used in said automatic gain control operation;

selection means, operatively connected to cutoff frequency generating means, for selecting either a light background mode or a dark background mode, each background mode causing a different predetermined cutoff frequency to be generated by said cutoff frequency generating means;

binary encoding means, operatively connected to said automatic gain control means and said selection means, for producing binary encoding signals of said image signal; and gating means, operatively connected to said binary encoding means and selection means, for selecting said binary encoding signals corresponding to said cutoff frequency;

said cutoff frequency generating means generating one of at least two cutoff frequencies to be used in said automatic gain control operation;

said binary encoding means producing a distinct set of binary data for each cutoff frequency selected.

8. The image signal processor as claimed in claim 7, wherein said selection means comprises an analog switch for selecting either said light background mode or said dark background mode.

9. The image signal processor as claimed in claim 7, wherein said binary encoding means has a different output port for each said set of binary data corresponding to a single cutoff frequency.

10. The image signal as claimed in claim 7, wherein said gating means comprises:
first AND gate means, responsive to said selection means and operatively connected to an output of said binary encoding means, for selecting said binary encoding signals corresponding to a first cutoff frequency;

second AND gate means, responsive to said selection means and operatively connected to an output of said binary encoding means, for selecting said binary encoding signals corresponding to a second cutoff frequency; and OR gate means, operatively connected to said first and second AND gate means, for outputting the selected binary encoding signals from said gating means.

11. The image signal processor as claimed in claim 7, wherein said binary encoding means comprises:
a first binary encoding circuit, operatively connected to said automatic gain control means and said cutoff frequency generating means, for comparing an output signal from said automatic gain control means with a first threshold potential level to produce a binary signal corresponding to said light background mode; and a second binary encoding circuit, operatively connected to said automatic gain control means and said cutoff frequency generating means, for comparing said output signal from said automatic gain control means with a second threshold potential level to produce a binary signal corresponding to said dark background mode.

* * * * *

UNITED STATES PATENT AND TRADEMARK OFFICE
CERTIFICATE OF CORRECTION

PATENT NO. : 5,068,910
DATED : November 26, 1991
INVENTOR(S) : Wataru Ogura

It is certified that error appears in the above-indentified patent and that said Letters Patent is hereby corrected as shown below:

<u>IN THE DRAWINGS</u>

Figure 4:
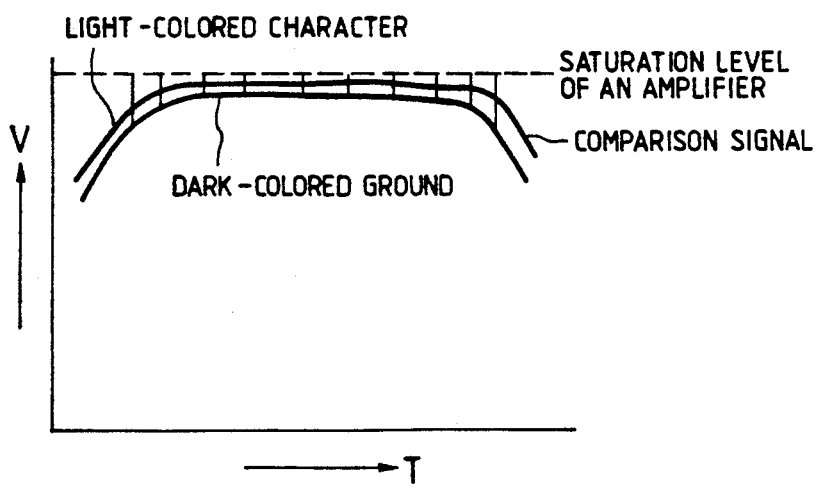
FIG. 4 shows graphs of signal components generated by conventional image pickup and printing apparatus.
Figure 4:
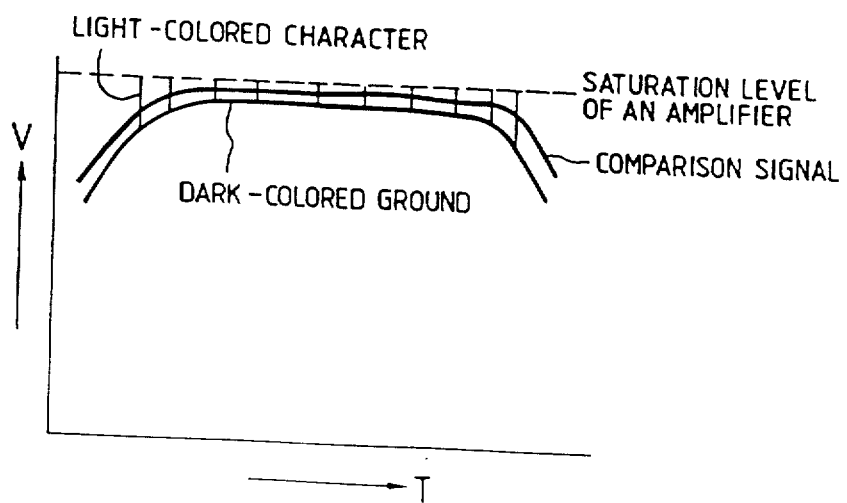

Delete Drawing Figs. 2 and 4, in the printed patent, and substitute therefor Drawing Figs. 2 and 4, as shown on the attached pages.

Signed and Sealed this

Eighth Day of June, 1993

Attest:

MICHAEL K. KIRK

Attesting Officer    Acting Commissioner of Patents and Trademarks